Dec. 8, 1931.  F. L. RITCHIE  1,835,430
GATE
Filed Sept. 12, 1928   4 Sheets-Sheet 1
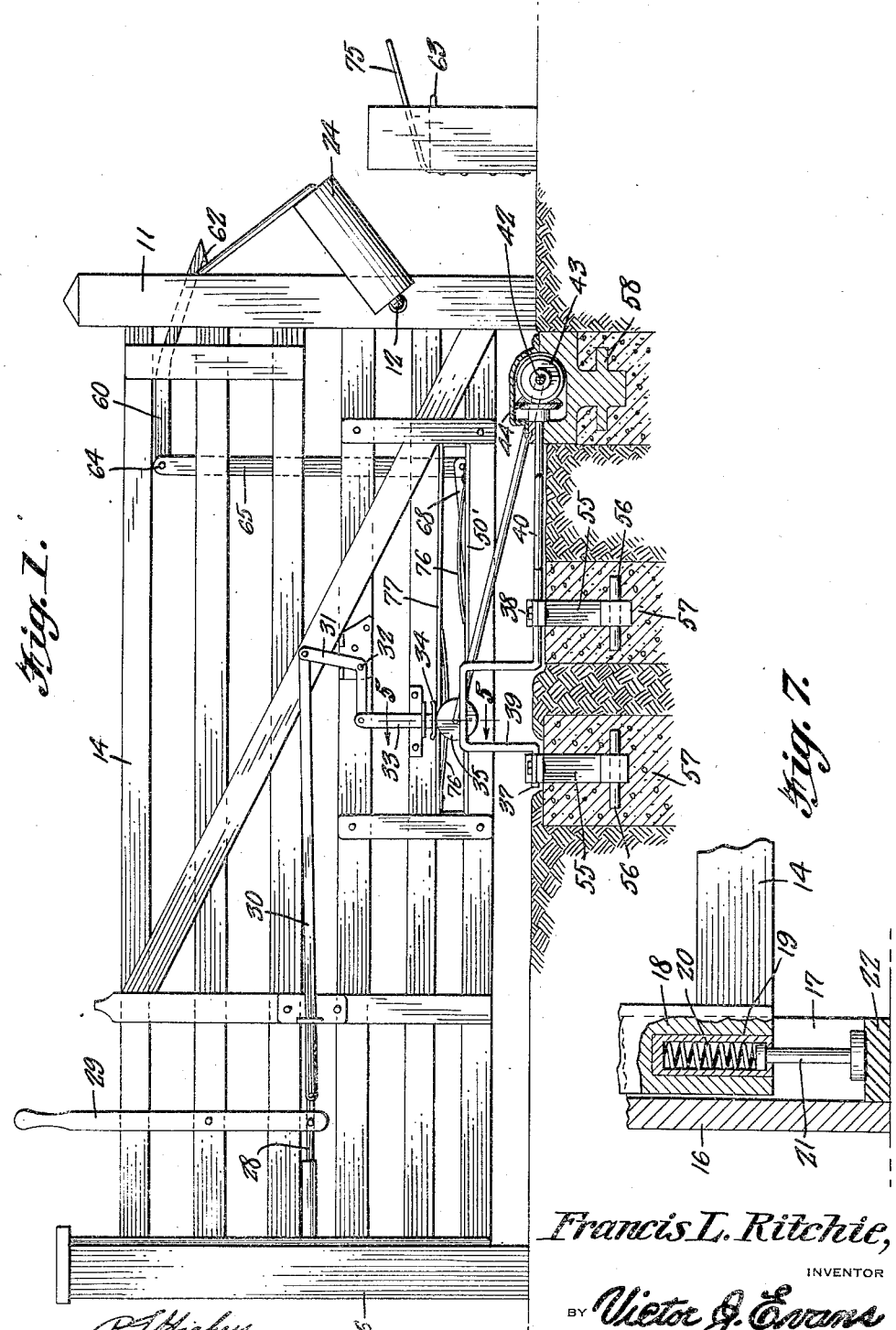
Francis L. Ritchie,
INVENTOR
BY Victor J. Evans
ATTORNEY

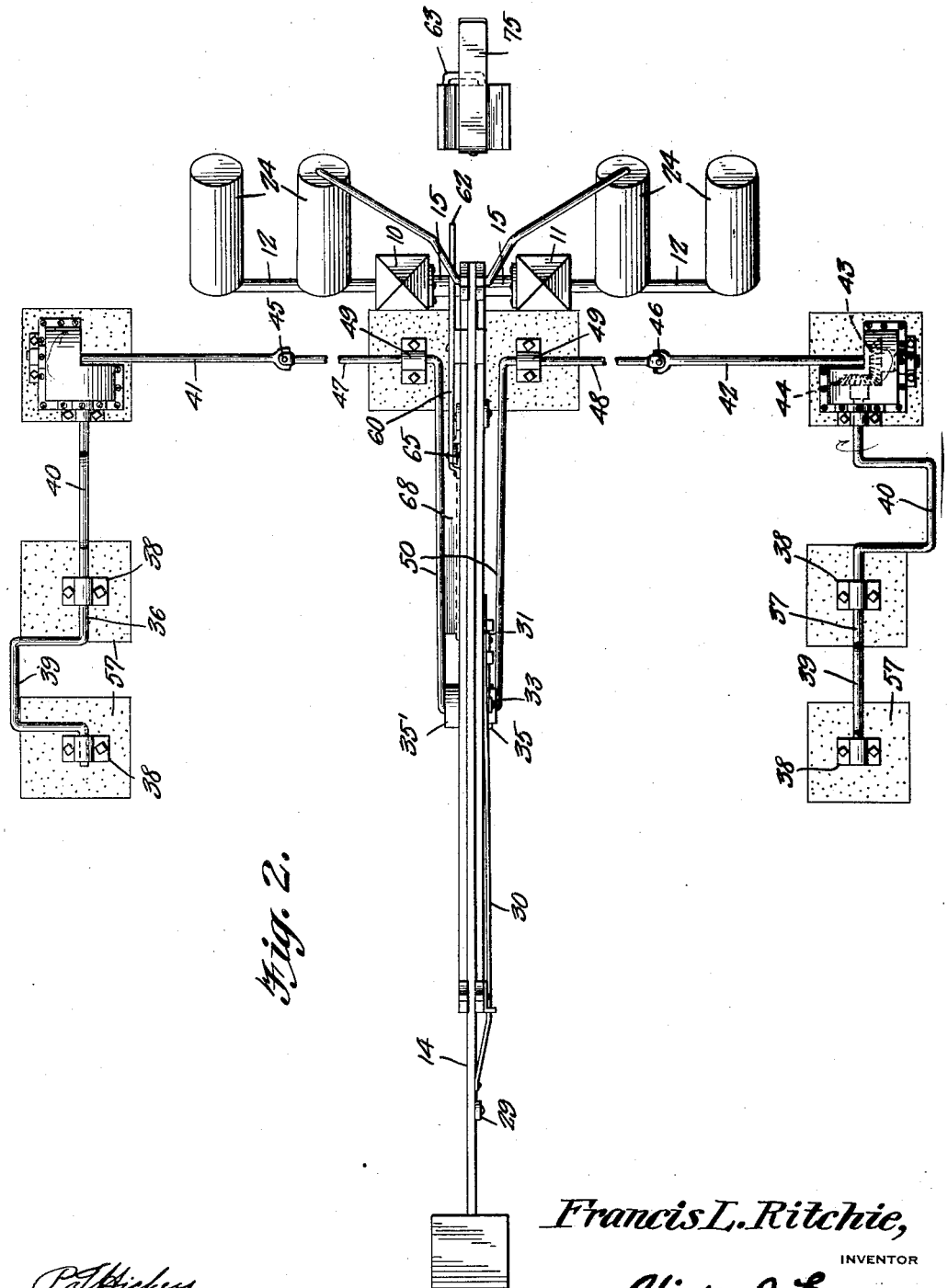

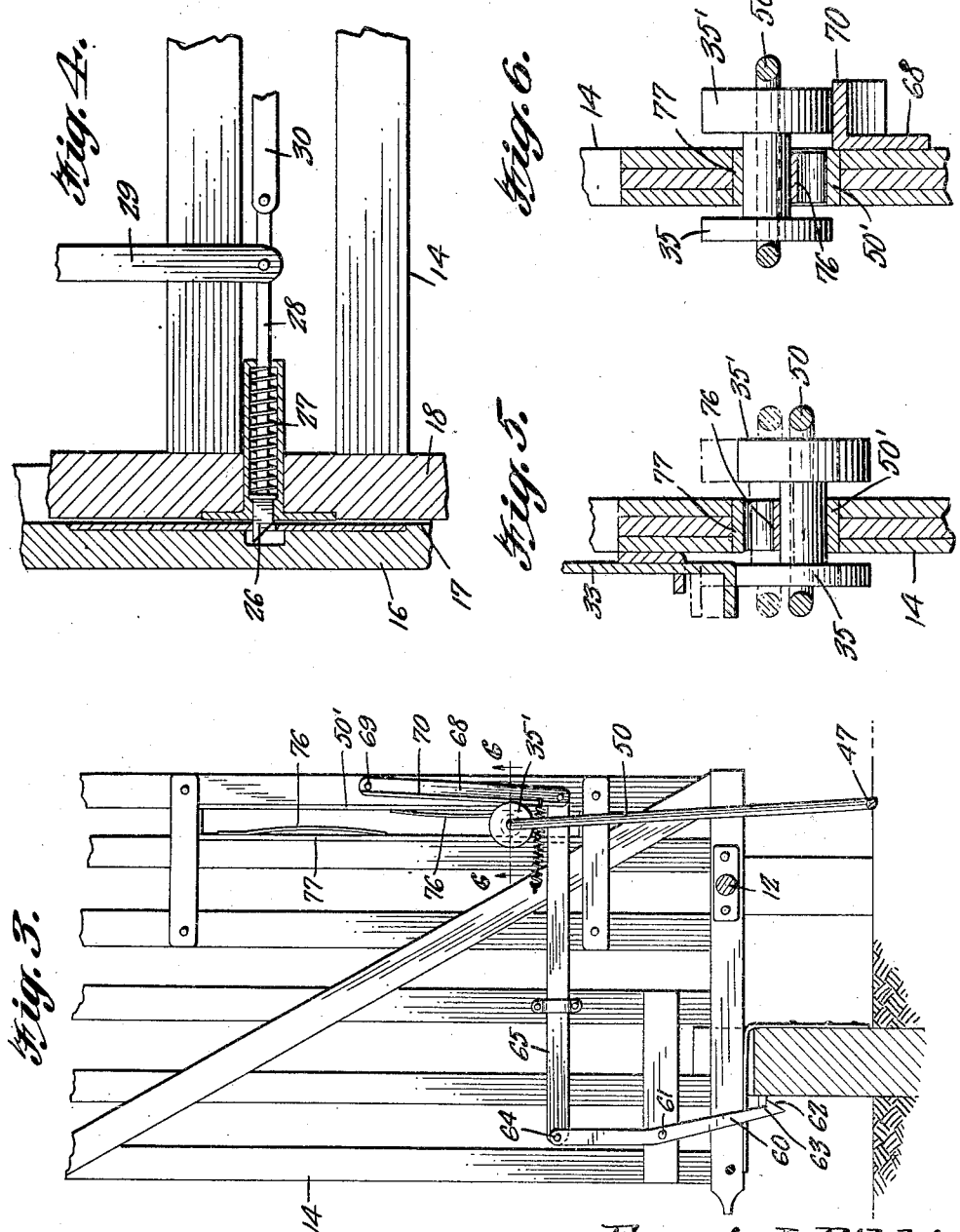

Dec. 8, 1931.  F. L. RITCHIE  1,835,430
GATE
Filed Sept. 12, 1928   4 Sheets-Sheet 4
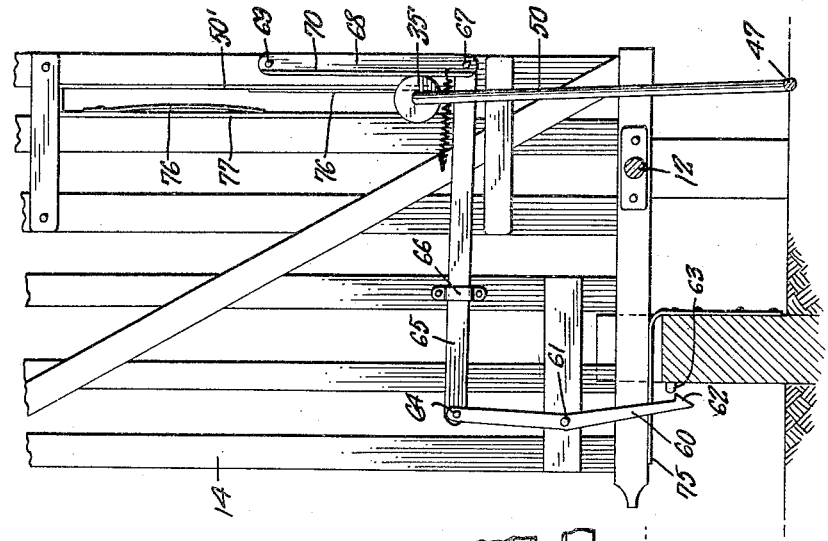
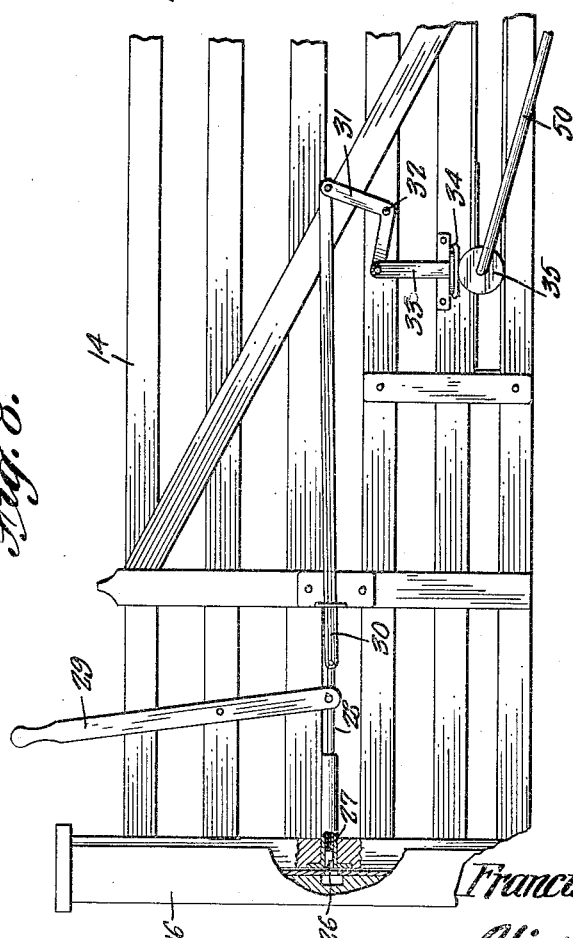
Francis L. Ritchie, INVENTOR
BY Victor J. Evans ATTORNEY
WITNESS:

Patented Dec. 8, 1931

1,835,430

UNITED STATES PATENT OFFICE

FRANCIS L. RITCHIE, OF NORTH MIDDLETOWN, KENTUCKY

GATE

Application filed September 12, 1928. Serial No. 305,560.

An object of this invention is to provide for raising a gate by a vehicle controlled element serving to rock a horizontal shaft including an arm thru which leverage is applied for releasing a latch and then tilting the gate upwardly about a pivotal point, in the opening movement, the shaft moving the arm in the opposite direction for the lowering movement.

With the foregoing and other objects in view, the invention consists in the novel construction and arrangement of elements described, illustrated and claimed, it being understood that modifications may be made within the scope of the claim without departing from the spirit of the invention.

In the drawings forming part of this application :—

Figure 1 is a view chiefly in elevation showing the gate and a portion of the operating mechanism.

Figure 2 is a top plan view of the gate, with the vehicle controlling devices on opposite sides thereof and each connected with a horizontal shaft including a bail shaped arm or lever for raising the gate, counterbalancing means being illustrated at the right of the shaft.

Figure 3 is a view showing the gate in elevation and after being tilted to open position.

Figure 4 is a fragmentary view showing the latching means.

Figure 5 is a detail in section on line 5—5 of Figure 1.

Figure 6 is a detail in section on line 6—6 of Figure 3.

Figure 7 shows in section a cushioning device mounted in the lower portion of the free end of the gate.

Figure 8 is chiefly in elevation, the gate being broken away and the latching means being in position for the release of the gate.

Figure 9 shows the gate tilted, a portion being broken away, and shows, in released position, the latching means for the elevated position of the gate.

The gate posts 10 and 11 are placed as shown in Figure 2, and a horizontal shaft 12 extends transversely of these posts and has bearings therein. The gate per se designated 14 is mounted on shaft 12, the bearing elements being designated 15, and the gate swings from the lower horizontal position to vertical and open position between the posts 10 and 11.

The gate post 16 includes an outer vertical element and spaced elements or upright members 17 between which the free end of the gate moves to an open or closed position. In the end element 18 of the gate a tubular member 19 is mounted and receives a coiled spring 20 bearing on the upper end of a plunger or the like 21 cooperating with a member 22 of rubber or other suitable material. This device is intended to relieve any shock which might otherwise be imparted to the gate in the lowering movement.

The gate is counterbalanced by providing a plurality of weights 24 to be carried by shaft 12, and latching means including the bolt or latch 26 controlled in part by a spring 27 and by bar 28 which may be manually operated by lever 29, and may also be operated by pull or thrust on bar 30 having pivotal connection with angle lever or bell crank 31. This angle lever is pivoted at 32 and a vertical element 33, also pivoted to the angle arm 31 carries a foot member 34 cooperating with roller 35, referred to below.

Vehicle operating means for the gate include the rock shafts 36 and 37 having bearings suitably mounted as for instance at 38, the rock shafts each including a plurality of crank elements such as 39 and 40. These elements are formed on each shaft at an angle of 90 degrees with reference to each other and the crank elements of shafts 36 and 37 are in the relative position illustrated in Figure 2, so that a vehicle moving toward the gate will always engage and operate one of these crank elements for rocking the shaft of which it forms a part,—and as the vehicle leaves the gate-way, the opposite rock shaft will be rotated for the purpose of closing the gate.

Rock shafts 36 and 37 transmit movement to a horizontal shaft comprising a plurality of sections, the outer shaft sections being designated 41 and 42, and each carrying a beveled gear wheel such as 43 meshing with a beveled gear wheel such as 44 on each of the aforesaid rock shafts 36 and 37.

Shaft sections 41 and 42 are connected by universal joints such as 45 and 46 with shaft members 47 and 48 mounted in bearings 49, on opposite sides of the gate.

A lever arm of bail shape, is designated 50, and is connected with or formed with shaft elements 47 and 48, this bail or lever arm mounting roller 35'. The element 50 and roller support 35' constitute the lifting means for tilting the gate about the axis defined by shaft 12, and it will be recalled that roller 35 controls the latch thru the mechanism illustrated near the central portion of Figure 8. Reference should be made incidentally to the fact that the rock shafts have their bearings anchored as shown in Figure 1, by way of illustration, elements 55 depending from the bearing elements 38, and carrying lower transverse devices 56 adapted to be embedded in concrete or tamped earth at 57. A similar anchoring arrangement is shown at 58 in connection with the mounting means for shaft 42 and the housing devices for the beveled gearing at 43—44.

A latch for holding the gate in elevated position is designated 60 and is pivotally mounted at 61, having a latch portion 62 engaging a stationary element 63. The latch 60 is pivotally connected at 64 with bar 65 slidable thru a guiding element 66 and said bar 65 is pivoted at 67 to bar 68 pivotally mounted at 69 and including a flange portion 70, so that the structure 68, 70 is in fact of angle bar type.

The flange 70 is engaged by roller 35' carried by lever arm 50 thru which power for raising the gate is applied. It will be understood that while the horizontal shaft including shaft sections 41 and 42, is rotated in one direction for lifting the gate, upon the engagement by the vehicle wheels of the crank elements on the rock shafts 36 and 37,—the lowering movement of the gate is effected by reverse operation when the vehicle wheels engage the elements of the rock shaft on the far side of the gate-way, after the vehicle passes thru.

In Figure 2 if a vehicle approaches, and engages lower crank 39, shafts 42 and 41 will rotate clockwise and raise the gate. At the same time shaft 36 will so rotate that upper crank 39 will move 90 degrees, to a raised position.

A departing vehicle will engage upper raised crank 39 and return it to the position of Figure 2, rotating shaft 41 counter-clockwise, for lowering the gate.

A resilient element 75 is mounted at the point shown in Figures 1 and 2, and is engaged by the gate when the latter is in vertical position, thereby constituting a cushioning device. A flat spring 76 bears on the central portion of the bail shaped lever arm 50, as shown in Figure 5, and provides freedom of movement, the central portion of the bail operating directly above the plate or guide member 50' and the spring 76 being below the upper plate or guide member 77. In effect, element 50 operates in a slot in the gate structure.

What is claimed is:—

The combination with a gate mounted to tilt about a horizontal axis, a horizontal shaft, a gate lifting arm connected with the shaft and movable angularly therewith, said arm including a portion positioned to impart lifting movement to the gate, a plurality of rock shafts each including crank elements disposed at an angle with each other, and gearing between the horizontal shaft and rock shafts, the rock shafts being on opposite sides of the gate, and the crank elements correspondingly positioned on the rock shafts being at different angles, latching means for the gate and devices for releasing the latching means automatically by the lifting arm, the devices for releasing the latching means from gate closing position including a vertically movable element, a roller carried by the gate lifting arm, and means for guiding the roller under the vertically movable element at predetermined periods with reference to the position and movement of the gate.

In testimony whereof I affix my signature.

FRANCIS L. RITCHIE.